Oct. 6, 1964    J. P. FELBURN    3,151,884
LOW-BED TRAILER WITH HINGED GOOSENECK FOR UNLOADING PURPOSES
Filed May 8, 1962    3 Sheets-Sheet 1
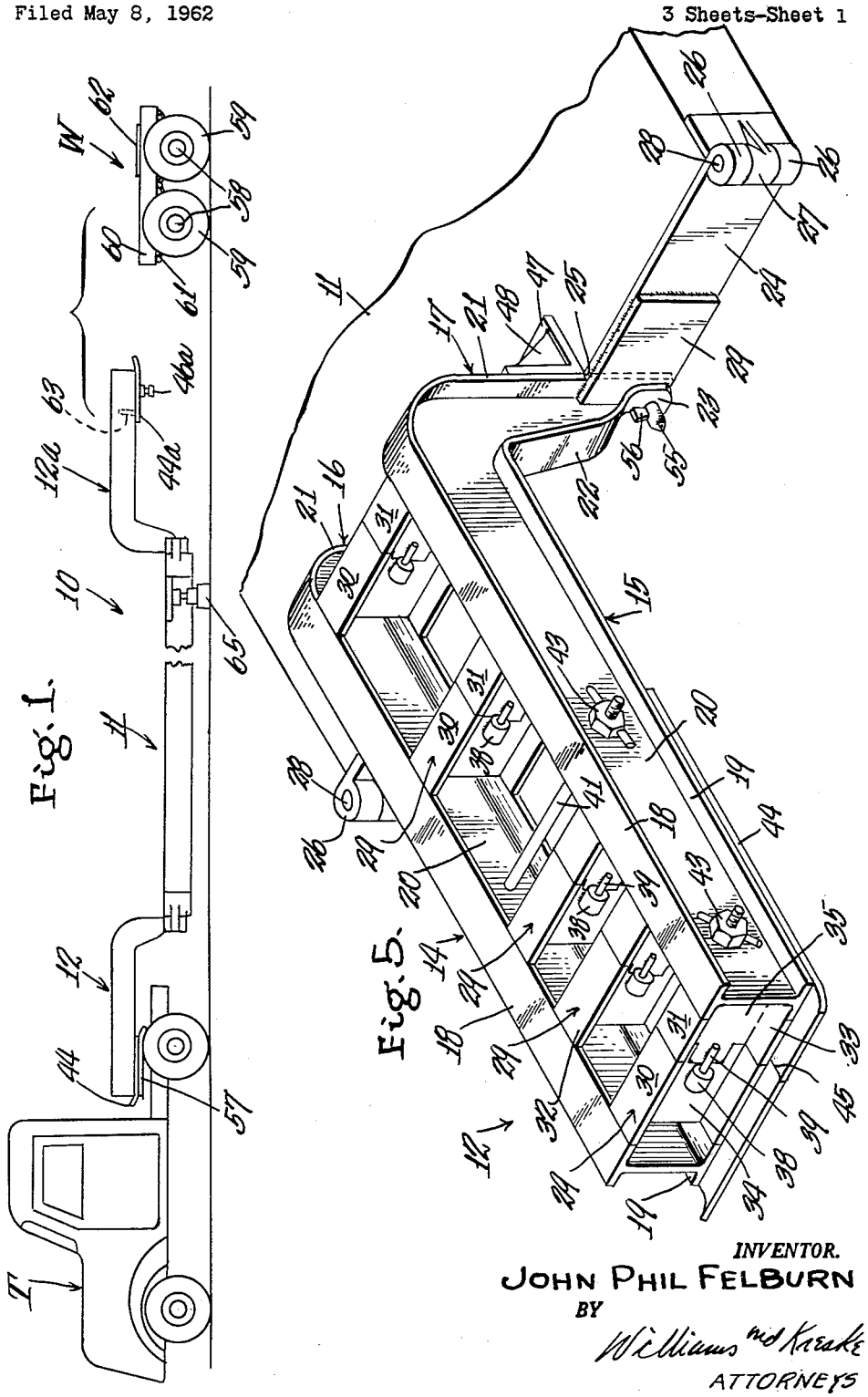
INVENTOR.
JOHN PHIL FELBURN
BY
Williams and Kreake
ATTORNEYS

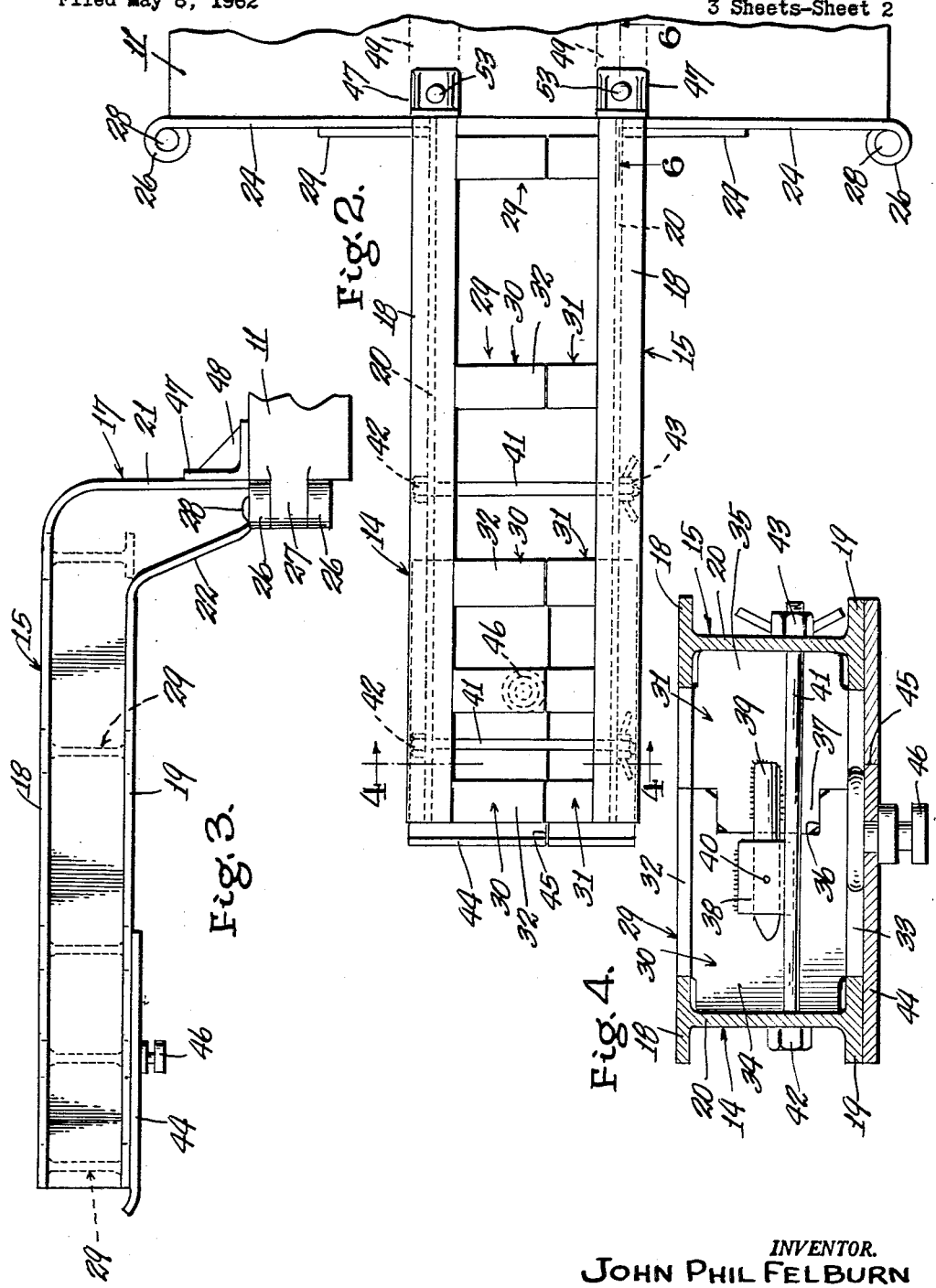

Oct. 6, 1964  J. P. FELBURN  3,151,884
LOW-BED TRAILER WITH HINGED GOOSENECK FOR UNLOADING PURPOSES
Filed May 8, 1962  3 Sheets-Sheet 3
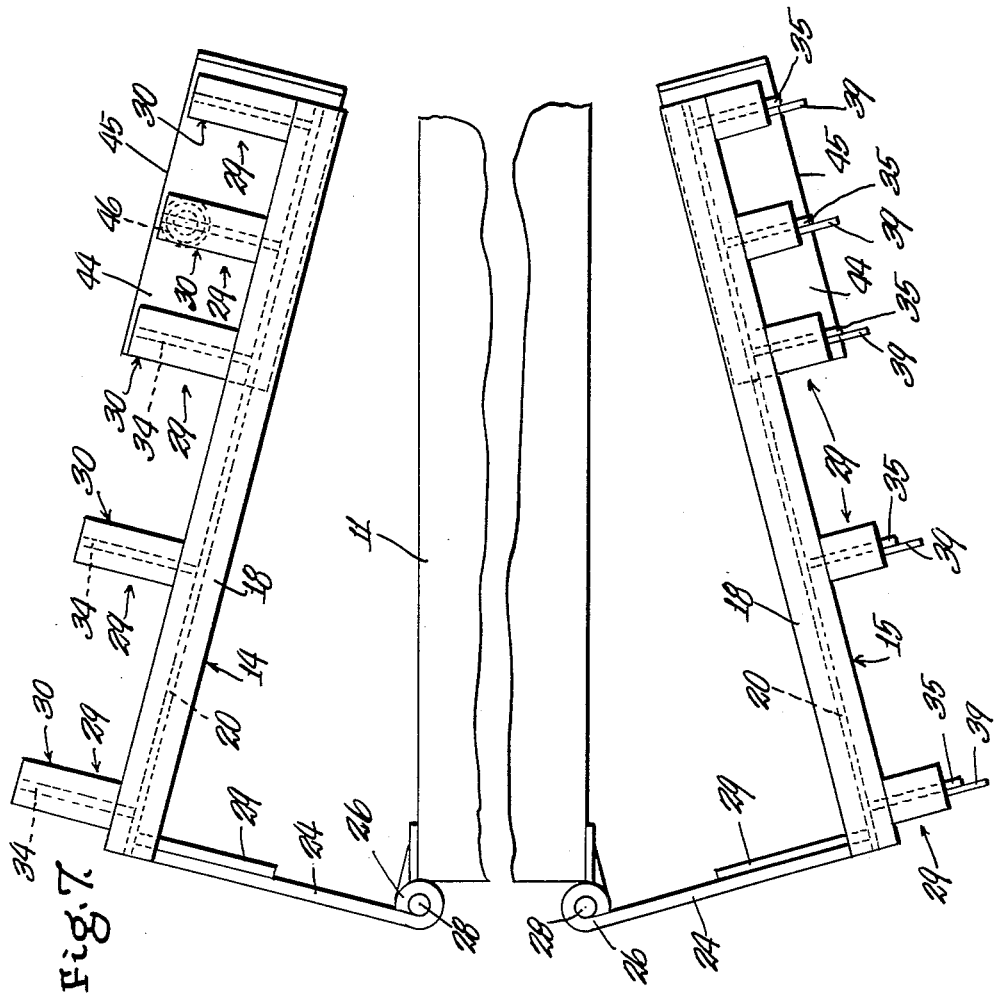
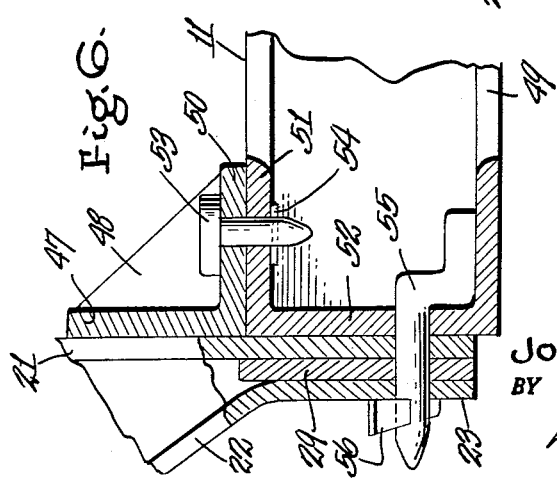
*INVENTOR.*
JOHN PHIL FELBURN
BY
*Williams and Kreeke*
*ATTORNEYS*

United States Patent Office 3,151,884
Patented Oct. 6, 1964

3,151,884
LOW-BED TRAILER WITH HINGED GOOSE-
NECK FOR UNLOADING PURPOSES
John Phil Felburn, 4160 W. Broad St., Columbus, Ohio
Filed May 8, 1962, Ser. No. 193,128
13 Claims. (Cl. 280—423)

My invention relates to freight hauling trailers, more particularly to low bed semi-trailers which are used to haul heavy apparatus and machinery, and the principal object of my invention is to provide new and improved trailers of this character.

Low bed trailers are especially suitable for heavy hauling since the heavy freight need not be lifted very high to place it in position on the trailer. Low bed trailers of the prior art comprise a trailer bed which is low slung to be close to the ground or roadway, the rear of such trailer having a raised portion to accommodate the rear wheel unit, and the front end having a gooseneck drawbar for connection to a towing vehicle, such as a tractor.

In the prior art low bed trailers, the load was shifted onto the trailer either from the side or over the rear wheels, and in many cases this presented considerable difficulty. On side loading, suitable and sufficient hoisting mechanism was required to lift a heavy load onto the trailer bed, thus defeating the advantage offered by the low bed, except when tall transformers or the like were hauled and bridge clearance was a necessity.

On loading over the rear wheels, either a hoist was necessary or the heavy load was pushed or pulled up a ramp extending from the trailer rear to the ground or roadway. This required suitable ramp material which often was not available. Makeshift ramp material was often dangerous and many accidents have resulted from use of inadequate ramp material. Although the entrance ramp may be constructed to provide a gradual incline, difficulties were encountered after the apparatus has passed the rear wheel unit. Sometimes the heavy load was permitted to drop from the rear wheel unit onto the bed, with the possibility of damage to either or both of the apparatus or trailer. On other occasions, a small ramp was erected to slide the heavy load from the rear wheel unit to the bed; however, because of space limitations this ramp was necessarily short and therefore ineffective. Further, with ramp from the rear wheel unit to the bed, valuable bed space was not utilized. Power shovels were frequently side loaded on prior art semi-trailers because of the low ramp required, but to properly orient the shovel lengthwise of the trailer in order to reduce overhanging of parts, considerable maneuvering of the shovel, after it was on the bed, was required. The prior art has also proposed the removal of the gooseneck drawbar to load the tractor from the front end, but this is a time consuming operation since removal of bolts, or nuts from bolts, after road debris has accumulated thereon, is not an easy matter. Further, parts were always subject to be lost or misplaced, but probably the greatest disadvantage was the great weight of the drawbar which made it difficult to remove and replace the same unless adequate help or hoisting apparatus was present.

To eliminate the disadvantages above, it was proposed to pivot the drawbar to one side of the trailer bed and swing the drawbar to one side to clear the front end of the trailer bed for front loading. However, here again the weight of the drawbar presented difficulties in that considerable help, either in the form of manpower or machine, was required. Further, considerable space was needed to provide clearance for the swinging of the single drawbar.

My invention overcomes the disadvantages of the prior art in that it provides a gooseneck drawbar made in sections which are connected for drawbar operation but which may be easily disconnected so that each section, which is comparatively light, may be shifted with a minimum of manpower to a position clear of the front end of the trailer bed. My invention provides a further advantage in that the trailer may be loaded either from the front or rear end with equal facility, and may have a tractor removably connected to the front and a wheel unit removably connected to the rear, or vice versa. Further advantages will be apparent as the description of my invention proceeds.

In the drawings accompanying this specification and forming a part of this application, there is shown, for purpose of illustration, an embodiment which my invention may assume, and in these drawings:

FIGURE 1 is a small scale broken side elevational view of a low bed semi-trailer embodying my invention, with a tractor connected to the forward end of the trailer and the rear wheel unit removed from the trailer bed.

FIGURE 2 is a top plan view of the gooseneck drawbar, drawn to enlarged scale, the tractor being omitted and the trailer bed fragmentarily shown, FIGURE 3 is a side elevational view of the construction shown in FIGURE 2, FIGURE 4 is a transverse sectional view, drawn to enlarged scale, corresponding to the 4—4 of FIGURE 2, FIGURE 5 is a fragmentary perspective view illustrating my improved gooseneck drawbar, FIGURE 6 is an enlarged sectional view corresponding generally to the line 6—6 of FIGURE 2, and FIGURE 7 is a view similar to FIGURE 2 but showing the gooseneck parts swung to position to permit front loading of the trailer bed.

With particular reference to FIGURE 1, the herein disclosed embodiment of my invention comprises a low bed semi-trailer 10 having a flat bed 11 which is usually rectangular in plan and disposed horizontally and close to the ground or roadway, as in the prior art. The disclosed embodiment has a gooseneck drawbar 12 at its forward end for connection to a towing vehicle, such as the tractor T, and preferably also has a similar gooseneck drawbar 12a at its rear end. The improved gooseneck drawbar 12 (or 12a) is formed of longitudinally extending sections which are connected to provide the drawbar but which are separable and at least certain ones are movable clear of the end of the trailer bed to leave such end unobstructed for loading and unloading thereover.

As best seen in FIGURES 2 and 5, the gooseneck drawbar 12 preferably comprises a pair of longitudinally extending draft sections 14, 15, each here shown as formed of steel I beams. In connected relation, the draft sections are generally horizontal and spaced in parallel relation. At the rear end of each draft section is a downwardly extending portion formed, for example, as downwardly curved continuations 16, 17 respectively of the sections 14, 15.

Each of the draft sections 14, 15 include top and bottom flanges 18, 19 connected by a web 20. As best seen in FIGURE 5, the flanges 18, 19 are curved downwardly at the rear of the gooseneck, to provide upright flange portions 21, 22, the portion 22 being inclined toward the portion 21 and terminating in a flat foot 23 which is parallel to but slightly spaced from the lower end of the portion 21. An arm 24, in the form of a steel plate, has one end butt welded to the outside edge of the flange portion 21, as seen at 25 (FIGURE 5), the other end of the arm terminating in a looped section 26 which is axially aligned with a loop 27 carried by the front side edge of the bed 11. A pin 28 passes through the aligned loops 26, 27 to form a hinge. To impart strength to the aforesaid construction, a plate 29 is closely interposed between the foot 23 and the adjoining flange portion 21 and the arm 24, portion 21 and plate 29 are welded together. It is to be noted that the web between flange portions 21, 22 terminates in the vicinity of the foot 23.

Cross members 29 extend between the draft members 14, 15 and, in the disclosed embodiment, the cross members are also formed of steel I beams. Each cross member is split transversely to provide portions 30 and 31. The upper and lower flanges 32 and 33 of each cross member substantially span the distance between the corresponding upper and lower flanges 18, 19 of the draft sections 14 and 15.

The web 34 of each cross member portion 30 is welded or otherwise rigidly connected transversely to the web 20 of draft section 14, and the web 35 of each cross member portion 31 is welded or otherwise rigidly connected to the web 20 of draft member 15. The webs 34, 35 of each cross member may have tongue and notch fit and, as seen in FIGURE 4, the web 34 is formed with a notch 36 into which fits a tongue 37 formed as an extension of web 35. The corners of the tongue and notch may be bevelled or rounded to facilitate their interengagement.

Suitable connections are made between the cross member portions 30, 31 and, as seen in FIGURE 4, such connections may comprise a socket 38 welded or otherwise rigidly secured to web 34 and a pin 39 welded or otherwise rigidly secured to web 35, the socket receiving the pin to maintain horizontal and vertical alignment of parts. A removable pin 40 may be disposed in aligned holes in the interfitting pin and socket to prevent unintentional withdrawal of the pin from the socket. To further increase rigidity, and to hold the draft members 14 and 15 against separation, one or more bolts 41 may span the draft member webs 20, 20 and extend through aligned holes therein. Each bolt preferably has a head 42 bearing against the outwardly turned surface of a web, and a wing nut 43 may be threaded on the bolt and bear against the outwardly turned surface of a web.

A fifth wheel plate 44 is welded to the under surface of the lower webs 33 of the three left hand cross members 29 (FIGURE 2) the plate being split, as at 45, along a line longitudinally of the gooseneck drawbar, the king pin 46 being carried by one section of the fifth wheel plate.

To more adequately support the draft sections in drawbar relationship, without requiring undue heaviness of parts, an angle member 47 (see FIGURES 5 and 6), formed with suitable integral gussets 48, is welded to each of the flange portions 21 of the draft sections 14, 15, preferably in alignment with the main longitudinal beams 49—49 (see FIGURE 2) of the bed. The member 47 has a horizontal foot 50 which overlies and engages the upper surface of the front end of the trailer bed 11, such as the upper flange 51 of a front channel 52 of the bed. A headed pin 53 is fitted through aligned openings in the foot 50 and flange 51 and, if desired, a cross pin 54 is secured through a cross bore in the headed pin 53 to maintain the latter against unintentional assembly.

Welded to the front channel 52, in line with each beam 49, is a steel peg 55 which has its free end extending forwardly through an opening in the web of the channel, and through aligned openings in the foot 23, plate 29 and flange portion 21, a wedge 56 being driven through a slot in the peg to hold parts against unintentional disassembly.

FIGURE 1 shows the front gooseneck drawbar 12 connected to a tractor T with the kingpin 46 seated within the usual slot in the fifth wheel 57 of the tractor, and with the fifth wheel bearing flatwise against the fifth wheel plate 44 of the gooseneck. The kingpin 46 may be held within the fifth wheel slot by a retractable latch as in usual manner. The rear wheel unit W is shown as a stable, multiple axle unit and includes a pair of axles 58, 58 supporting wheels 59, 59, the axles being connected to a platform 60 by springs 61 in the usual manner.

A fifth wheel 62, similar to the fifth wheel 57 of the tractor T (with the exception that it preferably does not have a horizontal pivot) may be carried by the top of the platform for detachable locking engagement with the kingpin 46a and the fifth wheel plate 44a may rest upon the fifth wheel 62. Any suitable mechanism may be used to lock the wheel unit W to the gooseneck 12a. If it is desired to hold the wheel unit against rotation about the kingpin 46a, an additional pin 63, spaced from the kingpin, may be disposed in aligned openings in the fifth wheel 62 and the fifth wheel plate 44a.

To load over the front end of the semi-trailer, the latch holding the kingpin 46 in the slot in the tractor fifth wheel 57 is retracted and the tractor is driven forward and removed from the trailer bed so that the front end of the latter falls to the ground or roadway surface, the rear wheel unit forming the pivot point about which the front of the bed swings downwardly.

The tractor is removed from in front of the semi-trailer and the wedges 56, and pins 54, 53 are removed. Either before or after removal of the aforesaid wedges and pins, the bolts 41 and pins 40 are removed, and thereafter the draft sections 14, 15 may be swung horizontally away from each other, about respective pivot pins 28, to position along respective opposite sides of the bed, as seen in FIGURE 6, to leave the front end of the bed unobstructed and close to the ground for easy loading and unloading thereover. Since each of the draft sections 14, 15 represents only one half of the gooseneck, one man may easily swing the sections to and from position along the sides of the bed.

To reassemble the draft sections 14, 15 to drawbar relation from the position shown in FIGURE 7, the workman swings the sections 14, 15 toward each other until the pins 39 seat within respective sockets 38 to align parts. The pins 40 are then driven into the cross holes in the pins 39 and the bolts 41 reinserted and wing nuts 43 tightened thereon. Thereafter, the headed pins 53 and holding pins 54 may be replaced and the wedges 56 driven in place. The gooseneck is now firmly assembled for drawbar operation. The tractor T may be backed to the gooseneck and the latter "humped" up on the tractor fifth wheel.

To load over the rear end, substantially the same operations as before pointed out are carried out, the wheel unit W being removed instead of the tractor. In this case, jacks 65 are preferably placed on opposite sides of the trailer bed to remove the weight of the load from the rear wheel unit W. The jacks are retracted, after the wheel unit has been removed, to lower the rear end of the trailer bed to the ground or roadway.

In some cases, it is desirable to remove both the tractor T and wheel unit W from the bed so that the latter lies flat on the ground. Sometimes, when maneuvering is difficult, tractors may be connected to the front and rear ends of the bed so that both ends may be steered and a pulling force may be applied at either end. Further, the wheel unit may be connected to that bed end which was previously connected to the tractor, and vice versa, in case conditions dictate entrance and exit of the bed from a restricted space solely by a pulling action.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A trailer bed having a drawbar at its forward end for connection to and support from a tractor, said drawbar comprising a pair of spaced structural steel sections extending longitudinally from said forward end, cross member means between said sections and split with one portion thereof connected to one section and the other portion thereof connected to the other section, connection means between said portions of said cross member means to hold the same connected and thus hold said structural steel sections in drawbar position, said connection means being separable to disconnect said portions of said cross member means and thus said structural steel sections, each of said sections being pivotally connected to a respective one of the opposite sides of said bed at the forward end thereof and swingable, when said connections means is separated, to position alongside said bed to leave said forward end unobstructed for loading and unloading thereover.

2. The construction according to claim 1 wherein said cross member means carries a split fifth wheel plate for sliding support on the fifth wheel of said tractor, one portion of said plate carrying a king pin for connection with said fifth wheel.

3. The construction according to claim 1 wherein bolt means span said structural steel sections to hold the same in drawbar relation.

4. The construction according to claim 1 wherein said cross member means comprises a plurality of spaced cross members, the portions of each having interfitting parts when said portions are connected.

5. The construction according to claim 4 wherein a split fifth wheel plate spans and is connected to a plurality of cross member portions and carries a pin for connection with the fifth wheel of said tractor.

6. A trailer bed having a drawbar at its forward end for connection to and support from a tractor, said drawbar comprising a pair of spaced I beam draft sections extending longitudinally from said forward end, a plurality of I beam cross members between said draft sections, each transversely split with one portion thereof connected to one draft section and the other portion thereof connected to the other draft section, a socket carried by the web of one portion of each cross member and a pin carried by the web of the other portion of each cross member, the pins being received within respective sockets, each of said draft sections being pivotally connected to a respective one of the respective opposite sides of said bed at the forward end thereof for swinging movement to respective sides of the latter to clear the forward end for loading and unloading thereover.

7. The construction of claim 6 wherein a fifth wheel plate spans and is connected to a plurality of cross members and carries a king pin for connection with the fifth wheel of said tractor.

8. The construction of claim 6 wherein a plurality of spaced bolts span said draft sections to hold them in drawbar relation.

9. The construction of claim 6 wherein the web of one portion of each cross member is notched to receive a tongue formed as part of the web of the other portion of the cross member.

10. The construction of claim 6 wherein each draft section has a removable connection with said bed at a point spaced from its pivot to the trailer.

11. A low bed trailer having a gooseneck drawbar at its forward end for connection to and support from a tractor, said drawbar comprising a pair of spaced horizontally disposed draft sections extending longitudinally and forwardly of said bed, each draft section having a downwardly extending portion adjacent to said bed forward end, said draft sections being releasably held in spaced parallel position intermediate the opposite sides of said bed to form the drawbar, an arm extending from each downwardly extending portion to a respective side of said trailer and pivotally connected to said bed at said side, whereby said draft sections, upon release, are swingable to the sides of said bed to leave the bed front end unobstructed for loading and unloading thereover.

12. The construction of claim 11 wherein spaced pins are carried by said bed and fit within sockets carried by respective downwardly extending portions of said draft sections at a point spaced from the pivot connection.

13. The construction of claim 12 wherein a part of the downwardly extending portion of each draft section overhangs and is pinned to a portion of said trailer for support.

References Cited in the file of this patent

UNITED STATES PATENTS

| | | |
|---|---|---|
| 2,431,388 | Fitzpatrick | Nov. 25, 1947 |
| 2,687,225 | Martin | Aug. 24, 1954 |
| 2,772,892 | Hake et al. | Dec. 4, 1956 |
| 2,848,252 | Martin | Aug. 18, 1958 |
| 2,878,033 | Polich | Mar. 17, 1959 |